United States Patent [19]

Yagoto

[11] Patent Number: 5,204,693
[45] Date of Patent: Apr. 20, 1993

[54] IMAGE RECORDING APPARATUS

[75] Inventor: Mitsutoshi Yagoto, Toyokawa, Japan

[73] Assignee: Minolta Camera Kabushiki Kaisha, Osaka, Japan

[21] Appl. No.: 661,692

[22] Filed: Feb. 26, 1991

[30] Foreign Application Priority Data

Mar. 3, 1990 [JP] Japan .................................. 2-51975

[51] Int. Cl.⁵ ............................................. H04N 1/21
[52] U.S. Cl. .................................... 346/108; 358/296
[58] Field of Search ................... 346/108, 107 R, 160, 346/76 C; 358/296, 298, 300, 302; 364/518; 395/100, 107, 155

[56] References Cited

U.S. PATENT DOCUMENTS 4,806,873  2/1989  Nagano ............................... 372/31
4,905,023  2/1990  Suzuki .................................. 346/108

Primary Examiner—Mark J. Reinhart
Attorney, Agent, or Firm—Price, Gess & Ubell

[57] ABSTRACT

A image recording apparatus for recording images on a film by a laser beam. The image recording apparatus include a light-emitting element, a monitor element for monitoring the intensity of the light emitted from the light-emitting element, a control means for controlling the intensity of the light emitted for the light-emitting element, and a selection means to select the intensity of the light emitted from the light-emitting element with a selection portion. The monitor element is insulated from the selection portion to keep out of the influence of the external noise.

16 Claims, 4 Drawing Sheets

IMAGE RECORDING APPARATUS

BACKGROUND OF THE INVENTION

1. Field of the Invention

The present invention relates to an image recording apparatus for recording images on microfilm by laser beam. More specifically, the present invention relates to an image recording apparatus for recording images on microfilm by a laser beam emitted from a laser element in an image exposure portion positioned in the film transport path wherein the microfilm is extracted from a film receptacle, transported through a film transport path and wrapped onto a film reel.

2. Description of the Related Art

In recent years a variety of devices have been proposed to record images frame-by-frame on microfilm by laser beam using roll-type microfilm. These devices comprise a cartridge for supplying raw unexposed film, a laser optical unit, a reel cartridge for winding exposed film, a film transport system for supplying raw unexposed film from the film supply cartridge to the optical unit exposure position, and a control system. The film used in the image recording device may be any commercially manufactured brand. Various films differ greatly in sensitivity characteristics depending on the manufacturer, and when jointly using films by different manufacturers the laser beam output intensity must be coordinated with the maximum exposure conditions of each film. Furthermore, even when using film by the same manufacturer, the finish density may be optionally varied according to the needs of the principle user. Therefore, it is desirable to provide a control knob on the operation panel of the image recording device to allow modulation of the laser beam output intensity.

Methods for modulating laser output include well-known methods of controlling monitoring current. However, the circuit carrying the monitoring current is readily affected by external noise because it is an analog circuit. A portion of the circuit carrying the monitoring current is a direct long lead line connected to the operation panel of the device and may produce faulty operation by the operation panel due to the aforesaid noise influence, such that in a worst case instance of said noise influence excessive current may flow to the laser element causing the laser element itself to be damaged.

SUMMARY OF THE INVENTION

A main object of the present invention is to provide an improved image recording apparatus that eliminates the previously described disadvantages.

A further object of the present invention is to provide an image recording apparatus capable of modulating laser output intensity without affecting the laser drive circuit by external noise.

A still further object of the present invention is to provide an image recording apparatus capable of modulating laser output intensity from the operation panel in accordance with the sensitivity characteristics of the film used, or in accordance with the finish density desired by the user without affecting the laser drive circuit by external noise.

The above mentioned objects of the present invention are accomplished by providing an image recording apparatus comprising a light-emitting element, a drive means to supply drive power to the light-emitting element, a monitor circuit for outputting the monitoring results used for monitoring the output of the light-emitting element, a control means for controlling the amount of output supplied to the aforesaid laser drive means based on the output value of the monitor circuit, a changing means that is connected to the monitor circuit and which changes the output value of the monitor circuit that is transmitted to the control means, a selection portion to select the amount of change in the output value of the monitor circuit that is changed by the changing means, and which has a selection means that is insulated from the monitor circuit.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The first embodiment of the present invention is described hereinafter with reference to FIGS. 1, 2 and 3.

Figure 1:
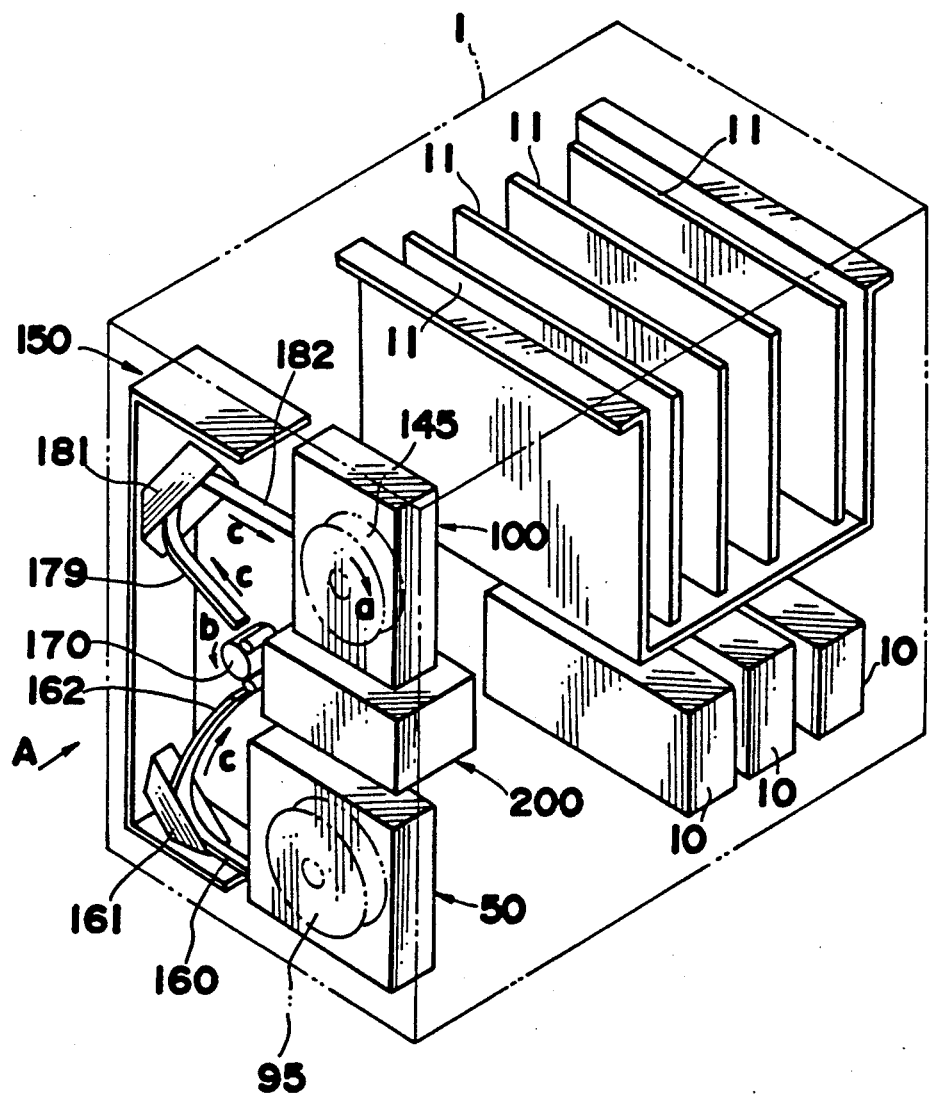
FIG. 1 is a perspective view showing the essential construction of the image recording apparatus of the present invention.
Figure 2:
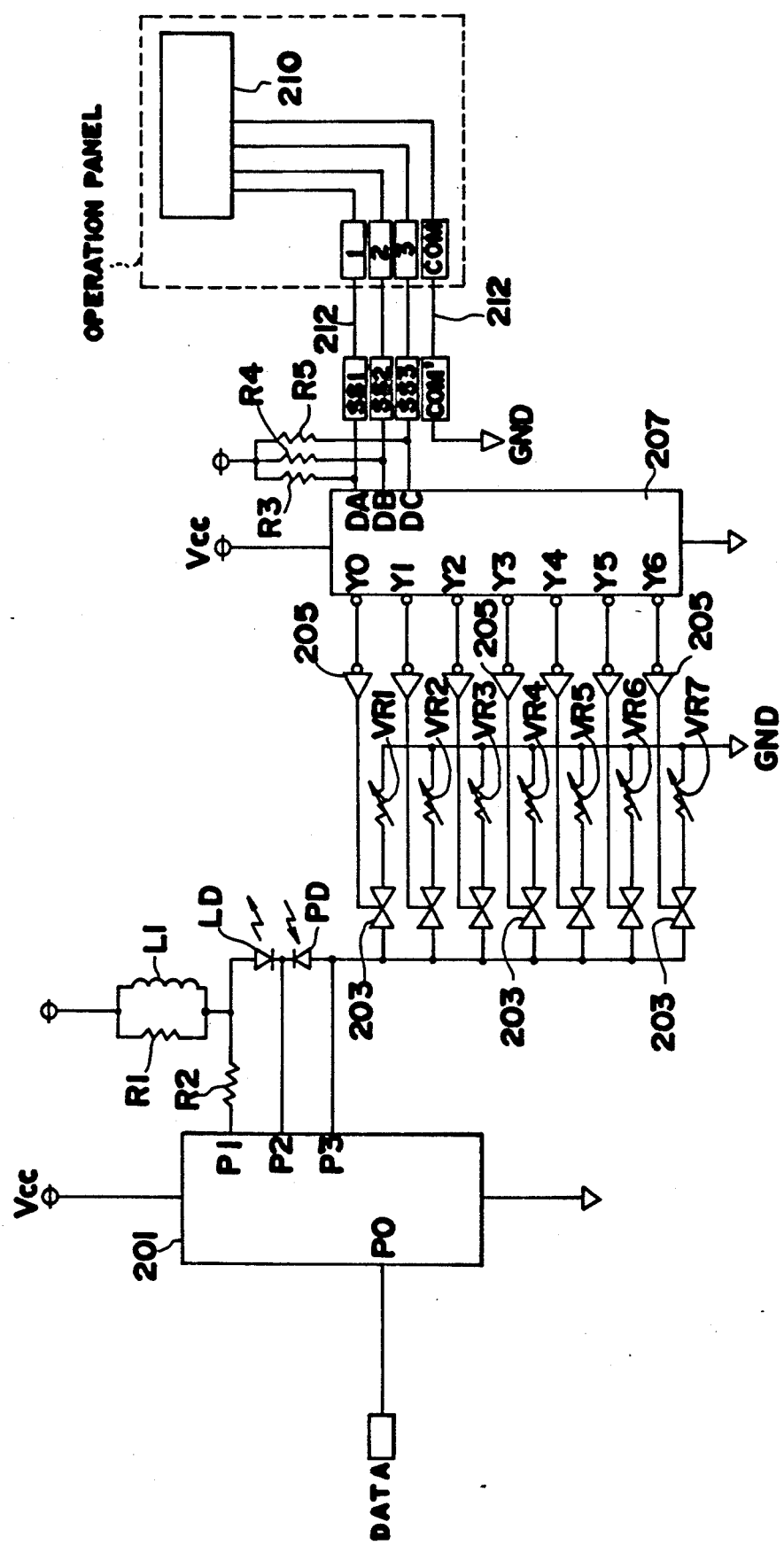
FIG. 2 is a circuit diagram showing the laser drive circuit of the first embodiment of the invention.

FIG. 1 shows the general construction of a laser image recording apparatus which is described below.

The apparatus of the present embodiment is a table-top type which completely houses the main components within unit frame 1, the front side of which is indicated by arrow [A]. Dispensing cartridge 50 and reel cartridge 100 are installed on holders (not shown in the drawing) at the right front side of unit frame 1 so as to be slidable toward the front. Within dispensing cartridge 50 is provided a film reel 95 that is rotatably supported lo therein and upon which is wound unexposed raw film.

A film reel 145 is accommodated in cartridge 100. Exposed film is wound upon film reel 145 when said reel 145 is rotatably driven in the arrow [a] direction.

The film path is formed by a film path unit 150 arranged at the left front side of unit frame I. The film path unit 150 comprises sequentially in the direction of film travel indicated by arrow [c] a film guide member 160 for guiding the film dispensed from cartridge 50, a slack detector 161, a guide member 162, a main roller 170, a guide member 179, a slack detector 81, and a guide member 182. The guide member 160 is provided with a film cutter not shown in the drawing.

The slack detectors 161 and 181 are provided to assure stable image recording by maintaining satisfactory unimpeded film travel. A light-emitting diode (LED) and a photosensor (not shown in the drawings) are provided in each of the detectors 161 and 181 to detect curvature in the film. Further, the main roller 170 is rotatably driven at a constant speed in the arrow [b]

direction by means of a stepping motor not shown in the drawing.

The Optical unit 200 includes a semiconductor laser, a beam-scanning polygonal mirror and an fΘ lens (not shown in the drawing) which are integrated in a single unit. A modulated laser beam exposes the microfilm held on the exterior surface of main roller 170, so as to record an image on the microfilm. A wet-type 16 mm silver salt film is used in this recording device, and a typical A4-size image is reduced to 1/24 the original size; the image is recorded at a density of 9600 DPI (dots per inch).

On the other hand, power units 10 for driving the optical unit 200, film path unit 150 and the like, and various control ports 11 are provided in the rear section of unit frame 1.

Film travel is described hereinafter.

The film is loaded automatically. That is, the film dispensed from cartridge 50 passes slack detector 161 and guide member 162, and is transported to the exterior surface of main roller 170. Then, the film is transported past guide member 179, slack detector 181 and guide member 182 toward the cartridge 100 by means of the rotation of the main roller 170 in the arrow [b] direction. Finally, the film is wound around film reel 145 in the cartridge 100.

Image recording by the optical unit 200 is accomplished by a main scan wherein a laser beam scans by means of the previously mentioned polygonal mirror, and a secondary scan wherein the film is transported by means of the rotation of the main roller 170. At this time, the main roller 170 is rotatably driven at constant speed.

When the desired image recording is completed, the film cutter is operated to cut the film, and then the cut film is wound around the film reel 145.

The laser drive circuit is described hereinafter with reference to FIG. 2. The laser drive circuit comprises a semiconductor laser LD, a laser driving integrated circuit (IC) 201, a laser monitoring photodiode PD, a switching integrated circuit (IC) 203, variable resistors VR1 through VR7, a digital integrated circuit (IC) 207, and a sliding code switch 210. Among the aforesaid components, the laser drive IC 201, digital IC 207, the variable resistors VR1 through VR7, and the switching IC 203 are mounted on a single circuit board (laser drive board) which is accommodated in the optical unit 200. The semiconductor laser LD and the monitoring photodiode PD are integrated in a single element which is disposed in near proximity to the laser drive board in the optical unit 200. The sliding code switch 210 is arranged on the operation panel of the image recording apparatus.

The main elements comprising the means for controlling the current supplied to the semiconductor laser LD are the laser drive IC 201, the monitoring photodiode PD, the switching IC 203 and the variable resistors VR1 through VR7.

One terminal of the semiconductor laser LD is connected to the power unit through the parallel circuits of the coil L1 and resistor R1, and is simultaneously connected to terminal P1 of laser drive IC 201 through resistor R2. The other terminal of the semiconductor laser LD is connected to terminal P2 of laser drive IC 201, and is simultaneously connected to one terminal of monitoring photodiode PD. The other terminal of monitoring photodiode PD is connected to terminal P3 of IC 201, and is simultaneously connected through switching IC 203 to the other terminals of the variable resistors VR1 through VR7 which are connected in parallel. The other terminals of the variable resistors VR1 through VR7 are grounded.

The laser drive IC 201 is an integrated circuit for executing automatic power control. That is, the monitoring photodiode PD provided with the semiconductor LD detects a portion of the laser beam emitted from the semiconductor laser LD and determines the output intensity of the laser beam; the intensity of the change of the laser output intensity changes the monitoring current of the photodiode PD. The change in the monitoring current is transmitted to terminal P2 of the drive IC 201, and the drive IC 201 outputs mores or less current to the semiconductor laser LD in accordance with the change in the monitoring current. The variable resistors VR1 through VR7 can correct for the change in the laser beam output intensity induced thermally during operation of the semiconductor laser LD using the drive IC 201, and are used to set the relationship between the monitoring current of the monitoring photodiode PD and the laser output intensity of the semiconductor laser LD.

On the other hand, the main elements comprising the selection means for optionally selecting from among the variable resistors VR1 through VR7 are the digital IC 207 and the sliding code switch 210. The sliding code switch 210 is provided on the operation panel 16 of the image recording apparatus (refer to FIG. 3), and the position of switch 210 is set by means of an adjustment knob 351. More specifically, the switch 210 has eight possible position settings, and in the present embodiment seven position settings are used. The switch 210 has three terminals 1, 2 and 3 which are conducting or non-conducting with terminal COM depending on the seven switch positions. The four terminals 1, 2, 3 and COM of sliding code switch 210 are respectively connected through leads 212 to terminals SS1, SS2, SS3 and COM' provided on the laser driving board in optical unit 200.

The terminals SS1, SS2 and SS3 are connected to the power unit through resistors R3, R4 and R5, respectively, and in the normal high-potential state are connected to the input pins DA, DB and DC of digital IC 207. The digital IC 207 characteristically sets one of the output pins Y0 through Y6 of the digital IC 207 to a low potential state by the combinations of high potential and low potential conditions of input terminals DA, DB and DC, while all the remaining output pins are set to high potential states. The output pins Y0 through Y6 of the digital IC 207 are connected to the control terminals of switching IC 203 through inverting terminals 205. The switching IC 203 is in a disconnected state when the control terminal is at low potential, and is in a conductive state when the control terminal is at high potential.

The operation of the previously described laser drive circuit is described below.

First, when the sliding code switch 210 is set at one of the seven positions, the terminals 1, 2 and 3 of switch 210 are connected to or disconnected from terminal COM in accordance with the position of switch 210. Because the terminal COM is connected to the terminal COM' which is grounded, Pins 1, 2 and 3 which are connected to the terminal COM are switched from high potential states to low potential states. On the other hand, the pins 1, 2 or 3 which are disconnected from terminal COM remain in high potential states. The terminals SS1, SS2 and SS3 are respectively set at high or low potential states in conjunction with the aforesaid terminals 1, 2 and 3. At the same time, the input pins DA, DB and DC of the digital IC 207 are set to either low or high potential in correspondence with the terminals 1, 2 and 3, and by the combination of settings one of the output pins YO through Y6 is set at low potential, while the remaining pins are set at high potential. For example, when only output pin YO is set at low potential, only the switching IC 203 directly connected to the variable resistor VR1 is switched ON. Accordingly, only the variable resistor VR1 is connected to the terminal of the drive photodiode PD, while the other variable resistors VR2 through VR7 are disconnected therefrom.

In this laser drive circuit state, when an image processing data signal is transmitted to input pin PO of the drive IC 201, a corresponding beam is emitted by the semiconductor laser LD. A portion of the laser beam is received by the monitoring photodiode PD and causes a monitoring current to flow in the photodiode PD. The monitoring current value is determined by the resistance value of the variable resistor VR1, and the current supplied to the semiconductor laser LD is controlled by the monitoring current value, such that the output intensity of the laser beam is thereby determined. Similarly, if the resistance values of the remaining variable resistors VR2 through VR7 are respectively preset at different values, laser beams will be produced at output intensities corresponding to these different resistance values.

As previously described, the laser drive circuit being an analog circuit comprising the control means which is easily affected by external noise is shielded from such external noise by being housed within the optical unit 200. Accordingly, the monitoring current can suitably control the current supplied to the laser element without being affected by noise. In contrast, the influence of external noise need not be considered in regard to the circuit comprising the selection means because said circuit is a noise-immune digital circuit or relay. The operation portion of this circuit may be disposed on the operation panel of the apparatus. Therefore, the laser beam output can be readily modulated by operating the adjustment knob 351 on the control panel 16 so as to switch the sliding code switch 210.

Figure 3:
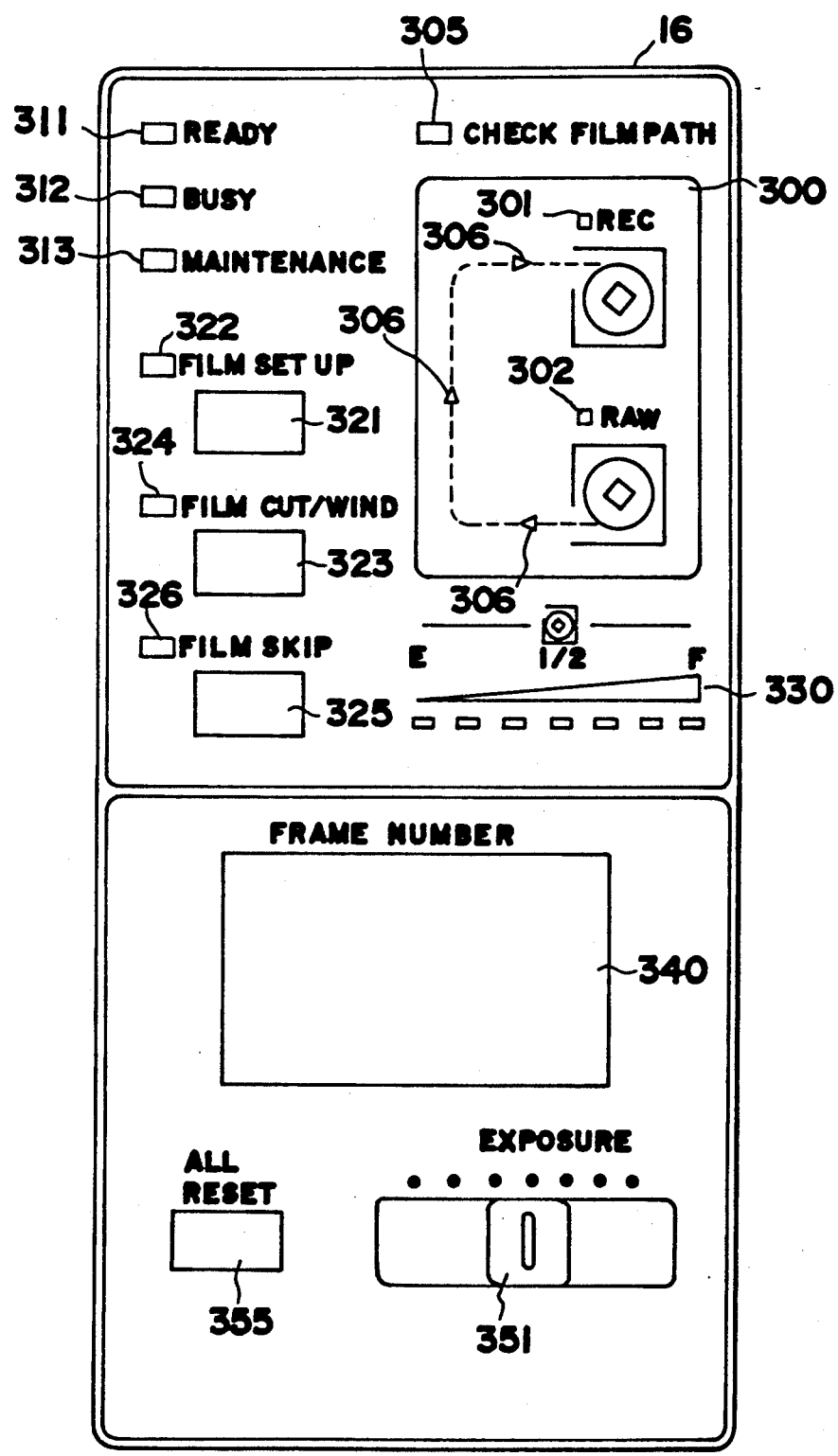
FIG. 3 is a front elevation view showing an example of the construction of the operation panel of the invention.

FIG. 3 shows the construction of the operation panel 16. Operation panel 16 is mounted on the front (on the outside of the film path unit 150) of the unit 1, and provides other features in addition to the adjustment knob 351. That is, the operation panel 16 also includes a display portion 300 for displaying the condition of film travel, said display portion 300 including an LED 301 that indicates when a reel cartridge 100 is not installed in a holder (not shown in the drawing), and an LED 302 that indicates when a dispensing cartridge 50 is not installed in a holder (also not shown in the drawings); an LED 305 that switches ON when a film jam occurs; a display 330 that indicates the remaining film quantity; a display LED 311 that indicates the completion of recording preparation; an LED 312 that indicates when the control portion is executing image recording; an LED 313 that indicates the maintenance condition of the optical unit 200; a film set-up key 321 for film autoloading input and a corresponding display LED 322 to indicate the set-up status; a film cut/wind key 323 to input film cut/wind instructions and a corresponding display LED 326; a film frame number display 340; an all reset key 355; and an LED 306 to indicate the film position during autoloading. If a film jam occurs, LED 305 is switched ON and the jam position is indicated by the LED 306.

Figure 4:
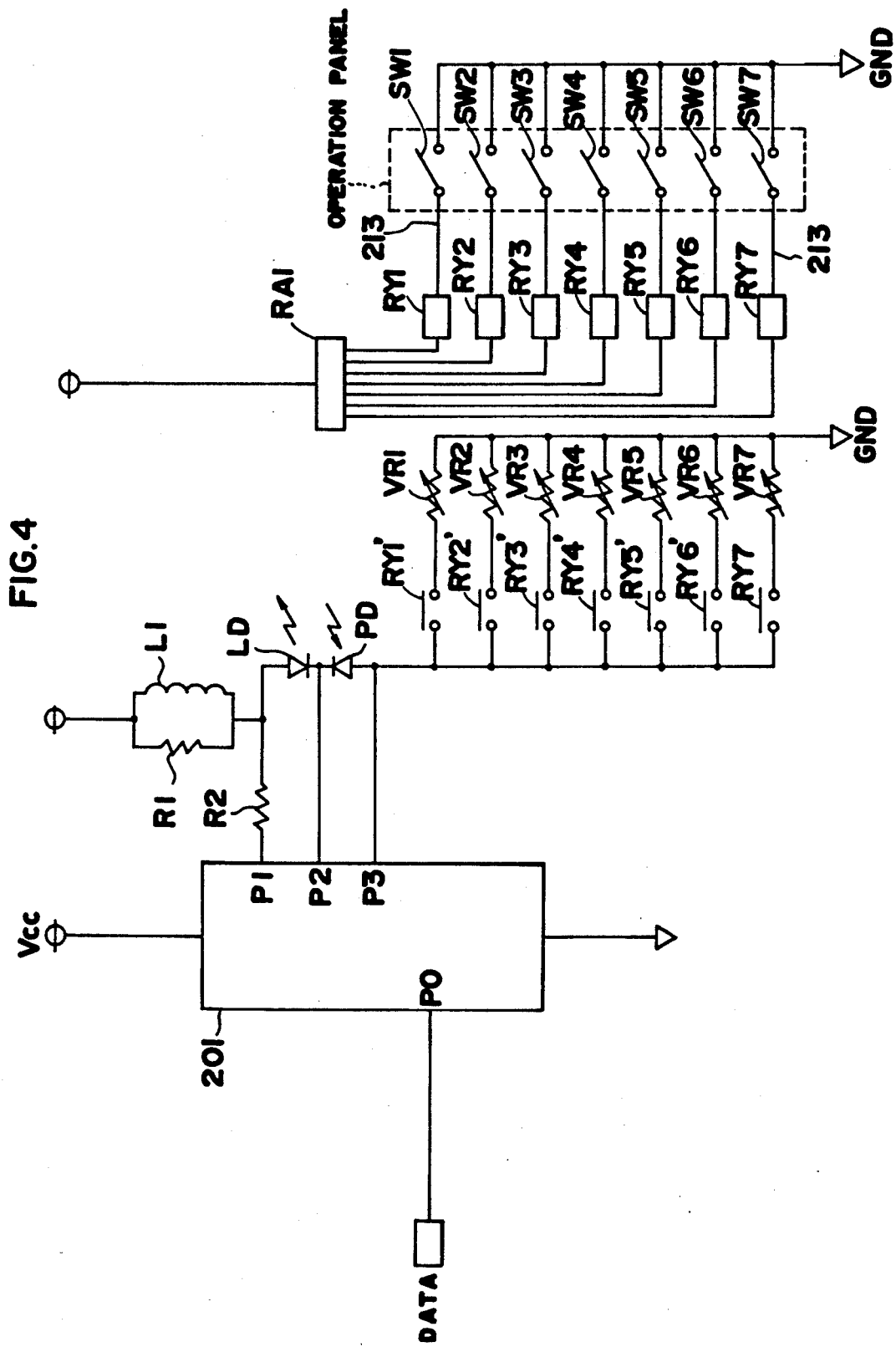
FIG. 4 is a circuit diagram showing the laser drive circuit of a second embodiment of the invention.

A second embodiment of the invention is described hereinafter with reference to FIG. 4.

This laser drive circuit uses a relay as the selection means. The main elements of the selection means are relays RY1 through RY7 and switches SW1 through SW7. Switches SW1 through SW7 are arranged on the operation panel of the image recording apparatus, while relays RY1 through RY7 are arranged at specific positions in optical unit 200. Switches SW1 through SW7 are arranged such that only one of said switches is conductive at a time. Each of the switches SW1 through SW7 are grounded at one terminal, while the other terminal is connected to one terminal of the coil portion of relays RY1 through RY7 by means of extension leads 213. The other terminals of the coil portions of relays RY1 through RY7 are connected to power source via resistor array RA1, such that when one of the switches SW1 through SW7 is switched ON, a current flows from the power unit to the coil portion of the relay connected to said switch, and the contact portion of that relay only is conductive. Relay contacts RY1' through RY7' are interposed between the terminal of the monitoring photodiode PD and the variable resistors VR1 through VR7.

The operation of the previously described laser drive circuit of the second embodiment is described hereinafter.

First, one of the switches SW1 through SW7 arranged on the operation panel is switched ON. For example, when switched SW1 is switched ON, current flows from a power unit to the coil portion of relay RY1, and the contact portion RY1' of relay RY1 enters a conductive state. At this time, the contact portions RY2' through RY7' of the remaining relays RY2 through RY7 remain in non-conductive states. Accordingly, only variable resistor VR1 is connected to the terminal of the monitoring photodiode PD, and the monitoring current value of the photodiode PD is determined by the resistance value of variable resistor VR1. Therefore, the current supplied to the semiconductor laser LD is controlled by the aforesaid monitoring current value so as to determine the output intensity of the laser beam. Similarly, if one of the other switches SW2 through SW7 is switched ON, the contact portion RY2' through RY7' of the relay RY2 through RY7 respectively connected to the switched-ON switch enters a conductive state. The input pins of the photodiode PD become conductive with the respective variable resistors VR2 through VR7, and produces a laser beam output intensity that corresponds to the resistance value.

Although the image recording apparatus of the present invention has been described by way of the preferred embodiments, the apparatus is not limited to the described embodiments inasmuch as various changes and modification are possible which do not depart from the scope of the present invention.

The resistors VR1 through VR7 need not necessarily be variable resistors, but may be fixed-value resistors. Such an arrangement has the advantage of not only preventing corresponding dispersion of the laser beam output intensities of individual semiconductor lasers, but also reduces the cost of manufacturing the apparatus.

Further, when a sliding code switch having more positions is used in the apparatus of the first embodiment and the number of variable resistors is increased in combination therewith, multistage laser output modulation becomes possible, thereby allowing more accurate exposure adjustment. Similarly, exposure adjustment precision is also improved when the number of relays is increased in correspondence with the switch in the apparatus of the second embodiment.

Although in the first embodiment a single resistor was connected to a single switching IC, it is also possible to connect a plurality of individual resistors in parallel to a single switching IC. In such a case, if the combination of resistors connected to each switching IC is changed, a laser beam output intensity corresponding to the resistance value of the aforesaid combination can be obtained.

Furthermore, the semiconductor laser LD and monitoring photodiode PD of both the first and second embodiments may be mounted on the laser drive board.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image recording apparatus comprising:
   a light-emitting element for emitting light;
   a drive means for supplying drive power to the light-emitting element;
   a monitor circuit for monitoring output of the light-emitting element and outputting the monitored results;
   a control means for controlling the amount of the drive power supplied to the light-emitting element based on the output value of the monitor circuit;
   a changing means connected to the monitor circuit and which changes the output value of the monitor circuit that is transmitted to the control means; and
   a selection means to select the amount of change in the output value of the monitor circuit that is changed by the changing means, and which has a selection portion that is disposed on the exterior of the image recording apparatus and insulated from the monitor circuit.

2. An image recording apparatus according to claim 1, wherein said changing means includes the plural sets of switching members and resistors, which are connected in parallel, and said switching member bring the resistor in connection with and out of connection with the monitor circuit according to the input by means of the selection means.

3. An image recording apparatus according to claim 2, wherein said switching member having an input terminal for inputting a switching signal from the selection means and the input terminal is insulated from the monitor circuit.

4. An image recording apparatus according to claim 3, wherein said selecting portion outputs a prescribed code depended on a selected state, and said selecting means include a digital circuit which output a prescribed signal depended on the code.

5. An image recording apparatus according to claim 2, wherein said switching member is a relay which is composed of a coil portion and a contact portion insulated rom each other, and said resistor is connected to the terminal of the contact portion and said output of selecting portion is connected to the terminal of the coil portion.

6. An image recording apparatus comprising:
   a laser element for emitting a laser beam;
   a drive means for supplying drive power to the laser element;
   a monitor element for changing a value of electric current through the monitor element according to output intensity of the laser element;
   a control means for controlling the amount of the drive power supplied to the laser element based on the output value of a monitor current of said monitor element;
   a changing means for changing the value of the monitor current that is transmitted to the control means and having plural sets of switching members and resistors which are connected in parallel, wherein each of said switching member brings the resistor corresponding thereto in connection with and out of connection with the monitor element; and
   a selection means to select the state of the changing means with a selection portion, and being provided on an exterior of the image recording apparatus and insulated from the monitor element.

7. An image recording apparatus according to claim 6, wherein said laser element is a laser diode and said monitor element is a photo diode, and the laser diode and the photo diode are formed in an integrated unit.

8. An image recording apparatus according to claim 7, wherein said switching member is a digital integrated circuit for bringing the resistor in connection with and out of connection with the monitor element according to the input by means of the selection means.

9. An image recording apparatus according to claim 8, wherein said selecting portion outputs a prescribed code depended on a selected state, and said selecting means include a digital circuit which output a prescribed signal depended on the code.

10. An image recording apparatus according to claim 9, wherein said control means and said changing means are disposed beside the laser element, and said selecting portion of the selecting means is disposed on an operation panel placed on the outside of the image recording apparatus.

11. An image recording apparatus according to claim 10, wherein said resistor of the changing means is a variable resistor.

12. An image recording apparatus according to claim 7, wherein said switching member is relay which is composed of a coil portion and a contact portion insulated each other, and said resistor is connected to the terminal of the contact portion and said output of selecting portion is connected to the terminal of the coil portion.

13. An image recording apparatus according to claim 12, wherein said control means and said changing means are disposed beside the laser element, and said selecting portion of the selecting means is disposed on an operation panel placed on the outside of the image recording apparatus.

14. An image recording apparatus according to claim 13, wherein said resistor of the changing means is a variable resistor.

15. An image recording apparatus for providing a recording light at various intensities to a recording medium, comprising:

a light emitting element for emitting a recording light;

drive means for supplying driving power to the light emitting element;

an operator panel positioned apart from the drive means and including a switch member mounted on the operator panel to provide a digital signal representative of a desired light intensity for the recording light;

a digital circuit connected to the switch member and positioned adjacent the drive means for providing an analog output signal representative of the value of the switch member;

a monitor circuit for monitoring the recording light and providing a monitor signal;

changing means connected to the monitor circuit and the analog output signal to adjust the monitor signal; and control means for controlling the amount of drive power of the drive means based on the monitor signal, the drive means, monitor circuit and changing means are insulated from the operator panel switch member to avoid the introduction of external noise.

16. An image recording apparatus of claim 15 wherein the light emitting element is a laser and the monitor circuit includes a photodiode, the laser and photodiode are mounted on a common support member adjacent the drive means.

* * * * *